United States Patent
Chen et al.

(10) Patent No.: US 7,286,466 B2
(45) Date of Patent: Oct. 23, 2007

(54) MULTICARRIER SYSTEMS

(75) Inventors: Nongji Chen, Guildford (GB); Robert Barnard Heaton, Ash Green (GB)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1044 days.

(21) Appl. No.: 10/353,928

(22) Filed: Jan. 30, 2003

(65) Prior Publication Data

US 2003/0169682 A1    Sep. 11, 2003

(30) Foreign Application Priority Data

Feb. 7, 2002   (EP) ................... 02250843

(51) Int. Cl.
 *H04J 11/00* (2006.01)
 *H04J 1/00* (2006.01)
 *H04K 1/10* (2006.01)

(52) U.S. Cl. .............. 370/210; 370/343; 375/260

(58) Field of Classification Search .......... 370/203, 370/206–208, 210, 343, 480, 482, 516; 375/222, 375/261, 326, 344, 355, 362, 364, 371, 260, 375/285, 346
See application file for complete search history.

(56) References Cited

U.S. PATENT DOCUMENTS 5,867,478 A * 2/1999 Baum et al. ............... 370/203
5,896,424 A * 4/1999 Uchida et al. ............. 375/346
5,903,823 A * 5/1999 Moriyama et al. ......... 455/126
6,643,339 B1 * 11/2003 Okanoue et al. ........... 375/349
6,850,481 B2 * 2/2005 Wu et al. .................. 370/208
6,853,616 B1 * 2/2005 Kim et al. ................. 370/210
6,985,432 B1 * 1/2006 Hadad ...................... 370/203
7,058,002 B1 * 6/2006 Kumagai et al. .......... 370/203
2001/0015954 A1   8/2001 Kuwabara et al.

FOREIGN PATENT DOCUMENTS

EP        1 047 232 A2    10/2000
WO       WO 01 56239 A    8/2001

OTHER PUBLICATIONS

Fazel, K., Narrow-Band Interference Rejection in Orthogonal Multi-carrier Spread-Spectrum Communications, International Conference on Universal Personal Communications, (1994).

* cited by examiner

*Primary Examiner*—Kwang Bin Yao
*Assistant Examiner*—Tung Tran
(74) *Attorney, Agent, or Firm*—Birch, Stewart, Kolasch & Birch, LLP

(57) ABSTRACT

In an OFDM receiver the complex values of predetermined pilot sub-carriers are compared with expected values to determine pilot distortion values for those sub-carriers. The phases of the differences between successive values are determined, and then the rate at which these phases change with respect to sub-carrier frequency is determined. Data distortion estimates for other sub-carriers can be calculated by interpolation of the pilot distortion values such that the data distortion estimates have a phase which substantially complies with the determined rate.

14 Claims, 4 Drawing Sheets

| FREQUENCY → | | | | | | | | | | | | | | | | | | |
|---|---|---|---|---|---|---|---|---|---|---|---|---|---|---|---|---|---|---|
| p | d | d | d | d | d | d | d | d | d | d | d | p | d | d | d | d | d | d |
| d | d | d | p | d | d | d | d | d | d | d | d | d | d | d | p | d | d | d |
| d | d | d | d | d | d | p | d | d | d | d | d | d | d | d | d | p | d |
| d | d | d | d | d | d | d | d | d | p | d | d | d | d | d | d | d | d |
| p | d | d | d | d | d | d | d | d | d | d | p | d | d | d | d | d | d |
| d | d | d | p | d | d | d | d | d | d | d | d | p | d | d | d | d | d |
| d | d | d | d | d | d | p | d | d | d | d | d | d | d | d | d | p | d |
| d | d | d | d | d | d | d | d | p | d | d | d | d | d | d | d | d | d |
| p | d | d | d | d | d | d | d | d | d | p | d | d | d | d | d | d | d |
| d | d | d | p | d | d | d | d | d | d | d | d | p | d | d | d | d | d |

← TIME

MULTICARRIER SYSTEMS

The invention relates to multicarrier systems, for example Orthogonal Frequency Division Multiplex (OFDM) receivers. In particular, the invention relates to estimating the channel transfer function of a transmission, for example to enable correcting for the distortions of a multicarrier transmission which can occur between a transmitter output and a receiver input, especially due to multipath interference of a radio transmission.

Using OFDM, each individual modulation symbol on each sub-carrier has a long duration. In this way channel impairments caused by a particular receiver receiving reflected signals, so-called multipath distortion and channel delay spread, are greatly reduced. This occurs since data on delayed signals from reflected paths hardly overlap with previously transmitted data on the direct path, as the duration of the data symbols on each sub-carrier is much longer than the delay spread caused by reflections. However, if reflected signals are present, the frequency response of the channel is affected, and individual sub-carriers within the OFDM signal may be attenuated. A channel estimator calculates this effect and allows the distortion to be compensated.

To increase the data rate, coherent modulation is often employed. Coherent modulation employs absolute values of amplitude and phase to convey the data. This makes the signal much more susceptible to channel impairments. For this reason, when employing coherently modulated OFDM, 'pilot' sub-carriers, with modulation values known by the receiver, are normally transmitted along with the main signal. The received pilots are then compared with what they should be and the difference is used to estimate and remove the channel distortion. This procedure is called equalisation.

Current wireless transmission schemes, for example digital video broadcasting terrestrial (DVB-T), Integrated Service Digital Broadcasting Terrestrial (ISDB-T), wireless local area networks, WLANs, (HIPERLAN/2, IEEE802.11a, MMAC) and digital audio broadcasting (DAB) all make use of pilot sub-carriers to help overcome the effect of multi-path signals. In the cases of DVB-T, ISDB-T and wireless LANs the pilots are only transmitted on certain sub-carriers at certain times. For DVB-T and ISDB-T pilot sub-carriers may be transmitted on each OFDM symbol, but only on a few of the sub-carriers.

In order to be able to correct for the signal distortions caused by the channel on the data sub-carriers between the known pilots, current receivers use filters and/or linear interpolators to interpolate between the pilots, and use the interpolated results to correct for the channel. Often several pilots are used with filtering in the frequency direction and in the time direction to remove the effects of noise. However, if the variations in the channel in the sub-carrier direction (i.e. in the frequency direction) are rapid, as will occur if reflected secondary signals are delayed for a relative long period with respect to the symbol duration of the main path OFDM signal, it is difficult to interpolate correctly. Additionally, it is difficult for the filter based channel equalisation approach to deal with the sub-carriers at the edge of the signal spectrum. At the low frequency edge there are no pilots which can be used below the edge of the spectrum; similarly at the high frequency edge there are no pilot sub-carriers higher in frequency. This increases the complexity of the filter implementation.

It would be desirable to provide an improved signal-processing method for channel estimation.

Aspects of the present invention are set out in the accompanying claims.

According to another aspect, characteristics of the channel over which the signal has passed are identified by using the transmitted sub-carriers, particularly the pilots, in a novel way. The identification is done by evaluation of the characteristic change in phase introduced by the channel between distortion values of adjacent pilot sub-carriers.

The channel distortion can then be compensated by equalising the channel response. This system generally produces superior results to prior art interpolation or filtering which technique becomes progressively worse as the multipath delay spread becomes a larger fraction of the OFDM symbol length. This is because the ripples in the signal spectrum caused by the multipath channel become more closely spaced relative to the pilot spacing. The filtered or interpolated estimation then becomes less exact.

Various alternative possibilities are envisaged.

For example, the invention could be applied to multicarrier systems which do not use pilots, provided the signal constellation of the transmitted data is known, for example in binary phase-shift keying and quadrature phase-shift keying systems. Thus, a data-aided decision procedure could be used wherein, for at least some sub-carriers, the derived complex data value is used to select one of a set of predetermined possible data values, the closest one being selected. A data distortion value can then be determined by comparing the derived complex value with the selected predetermined value. This permits the determination of distortion estimates for other sub-carriers. Accordingly, assuming that the data carried by some sub-carriers can be determined, it is possible to compensate for noise which may make the determination of the values carried by other sub-carriers difficult.

Although the invention will primarily be described in relation to estimated channel transfer functions for the purpose of channel equalisation, it is possible alternatively or additionally to use the techniques for measurement of the delay between two versions of a multicarrier signal. This is because the phase change between distortion values of different sub-carriers is dependent upon this time delay and therefore by determining the rate at which the phase changes, the time delay can be calculated. Accordingly, the invention could be applied to range finding or object-detection systems in which the time delay represents the distance between two points, one of which is the location of an object reflecting the signal, and the other of which is the location of another reflecting object or the source of the multicarrier signal (which may also be the location of the receiver of the signal).

An arrangement embodying the invention will now be described by way of example with reference to the accompanying drawings, in which.

Figure 1:
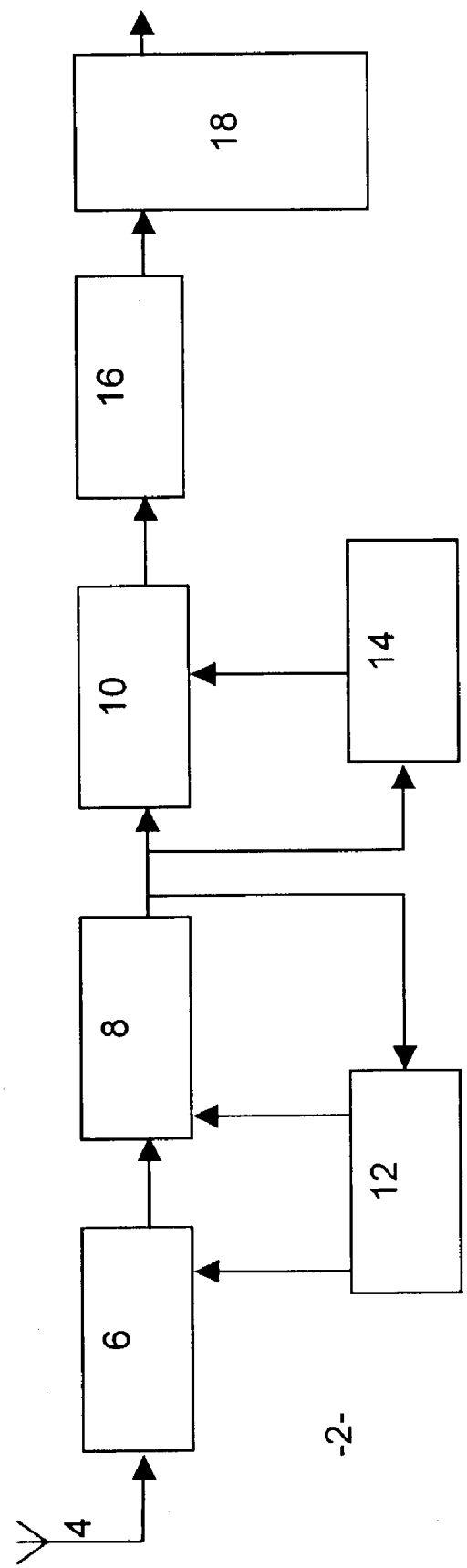
FIG. 1 is a block diagram of an OFDM receiver to which the techniques of the present invention can be applied.

An OFDM receiver 2 is shown in FIG. 1. An OFDM signal, which may have been subjected to multi-path reflection, is received at an antenna 4 and down converted to a suitable intermediate frequency (IF) by a down-converter 6. The signal is then sampled and converted to in-phase and quadrature components (complex numbers) by an IF-to-baseband converter 8 using methods which are in themselves well known. This sampled time domain signal is then transformed to the frequency domain by the receiver's Fast Fourier Transform (FFT) signal-processing block 10. If the receiver is correctly tuned and synchronised to the signal using a sample clock and frequency synchronisation block 12 and a symbol synchronisation block 14, the outputs of the FFT block are the received OFDM sub-carriers free of inter-carrier-interference (ICI). These OFDM sub-carriers are then fed to a channel estimation and equalisation block 16 for estimating the channel distortion at the data sub-carrier positions based on the sampled channel frequency response obtained at the pilot positions within the transmitted OFDM symbol and for removing or alleviating the distortion of the data sub-carriers by making use of the channel estimation results, yielding improved system performance.

The equalised data sub-carriers are then delivered to a demodulation and data decoding block 18. The technique described so far is known in the prior art.

Figure 2:
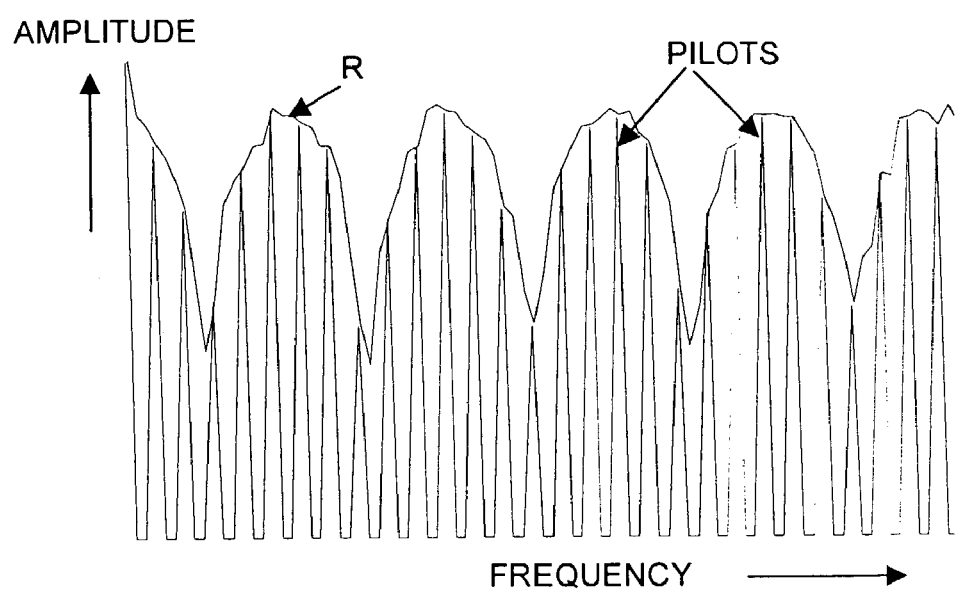
FIG. 2 shows the spectrum of the pilot sub-carriers of a signal resulting from a two path channel.

Referring to FIG. 2, this shows a typical plot of the amplitudes of pilot sub-carriers at different frequencies within a signal subject to multi-path interference which causes rapid variations, with respect to frequency, of the channel response characteristic R. Prior art techniques attempt to determine the response characteristic R by interpolation between adjacent pairs of pilot sub-carriers.

Figure 3:
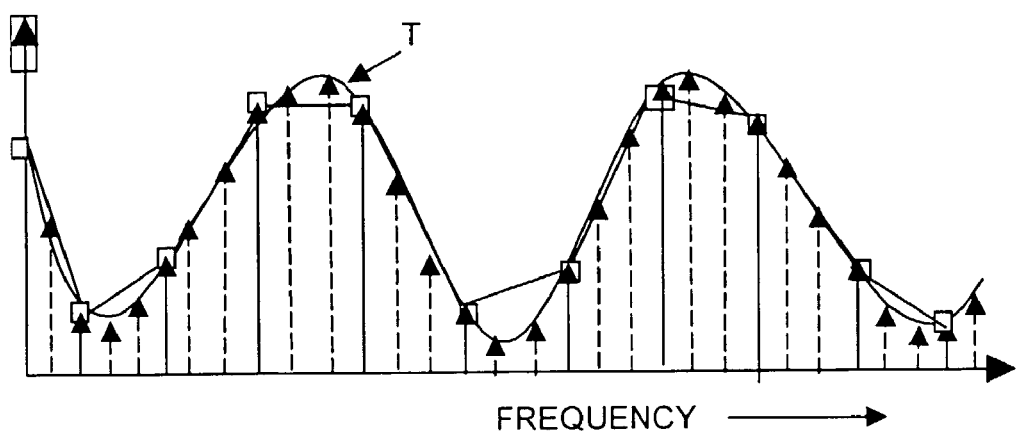
FIG. 3 is a diagram to show interpolation errors resulting from a prior art linear interpolation technique.

Thus, for each pilot sub-carrier, a pilot distortion value is calculated, for example by taking the ratio of the received signal to the known modulation values, to obtain a value $P_n$ for the channel transfer function of the sub-carrier n. Referring to FIG. 3, this plots the channel transfer function T with respect to frequency. It will be appreciated that by using linear interpolation it is possible to determine approximately the channel transfer function T values for the data sub-carriers (shown in broken lines) between adjacent pilot sub-carriers (shown in solid lines). It is assumed that the pilot sub-carriers are evenly spaced such that every $k^{th}$ sub-carrier is a pilot sub-carrier. The intervening data sub-carriers are at indexes i offset with respect to the pilots, whereby i=1, ..., (k−1). Prior art techniques for linear interpolation give a channel transfer function for the data sub-carrier (n+i) of:

$$ch_{n+i} = P_n - (P_n - P_{n+k})i/k$$

However, such interpolated data distortion estimates can be inaccurate, particularly in the areas of the peaks and troughs of the channel transfer function T, as can be seen from FIG. 3.

In accordance with the present invention, these problems are mitigated by using the techniques described below for the channel estimation process in the block 16. In the following, it is assumed that the receiver 2 is synchronised to the strongest path of the channel, which is normally the component associated with the main or direct ray of the received signal, in order for the system to operate most effectively.

It has been observed that, as a result of multi-path distortion, in a receiver which is synchronised to the main response or channel amplitude peak region, the phase of the difference between a particular pair of samples of the channel response at lower frequency sub-carriers tends to be higher than that of another particular pair of sub-carriers which are higher in frequency. It is the aggregated delay in the channel which causes the phase value to fall as frequency increases. This phase behaviour can be harnessed to establish a phase rotation variable α resulting in a two-path model that approximates the phase characteristic of the underlying multi-path channel response. In practice the strongest two paths dominate. Thus, by determining the extent α to which this phase varies with respect to sub-carrier frequency, it is possible to perform a more accurate interpolation between pilot distortion values in order to obtain data distortion estimates.

Figures 4, 6:
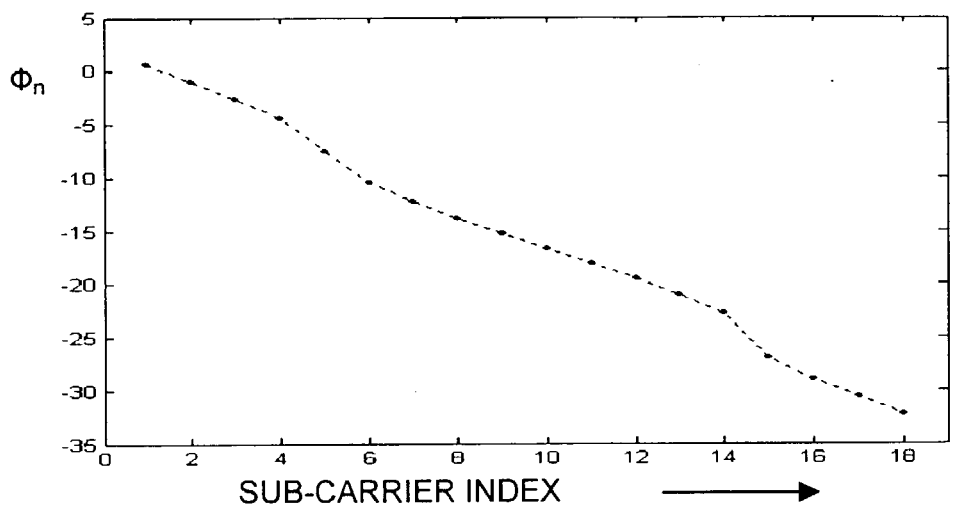
FIG. 4 shows a typical trend of the phase of a value representing changes in the distortion of sub-carriers in a signal subject to multi-path interference.
FIG. 6 is a chart showing an example of the distribution of pilots amongst OFDM symbols.

Assuming that the receiver is synchronised with respect to the directly-received signal, and that there is a single, delayed reflected signal, with a delay of τ, then the phase $\phi_n$ of the difference $\delta P_n$ between channel responses $P_n$, $P_{n+k}$ at two sub-frequencies will vary with respect to sub-carrier frequency at a rate α=−δωτ, where δω is the angular frequency increment between the sub-carriers. A two-path system will produce a linear change in this phase, i.e. α is a constant. For typical multi-path channels with more than two paths, the phase, when plotted against frequency, shows a varying degree of ripple along a dominant trend of a straight line, reflecting the aggregate effects from all the paths, as indicated in FIG. 4.

In the preferred embodiment of the present invention, the variation of the phase $\phi_n$ with respect to frequency is calculated, for example by assuming a straight line and determining the slope α of the line, this describing an equivalent two-path model that approximates the phase characteristic of the actual sampled channel response. This can be done using the following linear regression function, which can be derived in a per se known manner:

$$\alpha = \frac{\left( \sum_{n=0}^{N-2} (n + 1 - 0.5N) \varphi_{n_0+nk} \right)}{\sum_{n=0}^{N-2} (n + 1 - 0.5N)^2} \tag{1}$$

where n is the sub-carrier index, N is the number of pilots used, k is the pilot spacing and $n_0$ is the carrier position of the lowest frequency pilot.

It would alternatively be possible to derive a non-linear function representing the change of phase $\phi_n$ of $\delta P_n$, with respect to sub-carrier frequency, to give greater accuracy in situations where α is not constant, but at the expense of greater complexity.

For the two-path situation, it can be shown that, if the signals from the respective paths are $\lambda_0$ and $\lambda_1$, the time delay between them is τ, and the FFT window in the OFDM receiver is synchronized to $\lambda_0$, the frequency response of the channel at the carrier positions can be represented as:

$$P_n = \lambda_0 + \lambda_1 \cdot e^{-j\omega_n \tau} \tag{2}$$

$$ch_{n+i} = \lambda_0 + \lambda_1 \cdot e^{-j(\omega_n + i\delta\omega/k)\tau} \tag{3}$$

$$P_{n+k} = \lambda_0 + \lambda_1 \cdot e^{-j(\omega_n + \delta\omega)\tau} \tag{4}$$

Thus:

$$\delta P_n = P_n - P_{n+k} = \lambda_1 \cdot e^{-j\omega_n \tau}(1 - e^{-j\delta\omega\tau}) \tag{5}$$

and:

$$P_n - ch_{n+i} = \lambda_1 \cdot e^{-j\omega_n \tau}(1 - e^{-j\delta\omega\tau i/k}) \tag{6}$$

Rearranging equation (5) and substituting $\alpha=-\delta\omega\tau$ yields:

$$ch_{n+i}=P_n-\lambda_1 \cdot e^{-j\omega n\tau}(1-e^{j\alpha i/k}) \quad (7)$$

Combining equations (5) and (7), the channel response at the data carrier position n+i is $$ch_{n+i}=P_n-(P_n-P_{n+k})(1-e^{j\alpha i/k})/(1-e^{j\alpha}) \quad (8)$$

Equation (8) can be shown to be valid for i<0 and 0<i<k. Following a similar approach, the following, valid for i>k and 0<i<k, can be shown:

$$ch_{n+k+i}=P_{n+k}-(P_{n+k}-P_n)(1-e^{j\alpha i/k})/(1-e^{-j\alpha}) \quad (9)$$

Equations (8) and (9) are globally valid only for precise two-paths channels. For other more generic multi-paths scenarios, they should be regarded as a local small signal approximation to the channel gains expressed as an equivalent two paths model centred at the pivotal point.

Figure 5:
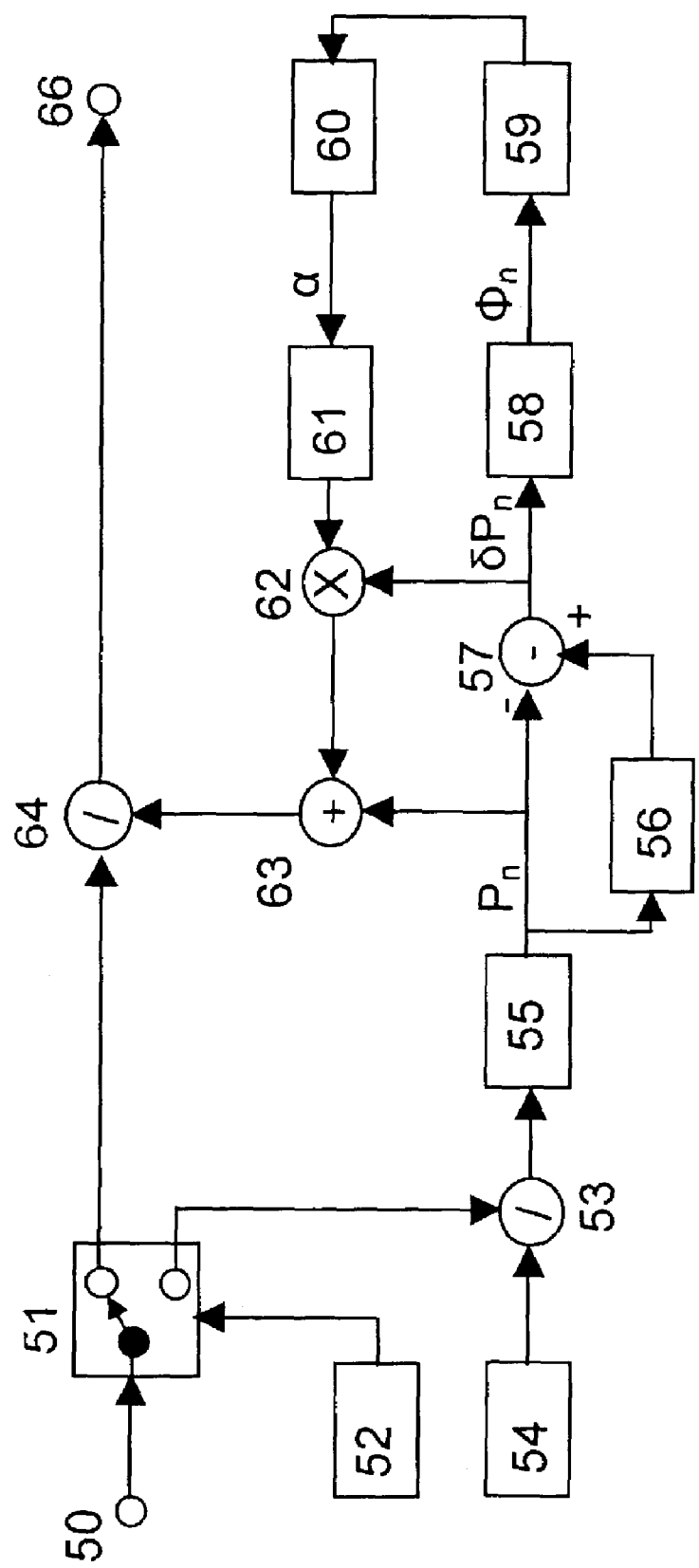
FIG. 5 is a block diagram of a channel estimation and equalisation system according to the present invention.

FIG. 5 is a block diagram of a channel estimation and equalisation block 16 which operates using these techniques. After the FFT operation at block 10 (FIG. 1), the OFDM sub-carriers are fed from block input 50 to a sorting component 51 which separates the pilots from the data sub-carriers, based on the control output from a pilot selector 52, which indicates which sub-carriers are pilots. The pilots are then fed to a divider 53, where the channel response samples at the pilot positions are evaluated, by comparison with the known modulated data (obtained from pilot data source 4) on these pilot sub-carriers.

The output from divider 53 is a serial string of the channel response samples. These samples are regrouped, in general at the boundary of a symbol, to form framed data for filtering operations in time within a filter 55.

The filtered channel samples $P_n$ from filter 55, representing the k-decimated channel spectrum, where k is the spacing of the filtered channel response samples, are serially fed to a delay 56 and a subtractor 57 to calculate $\delta P_n=P_n-P_{n+k}$.

The output of subtractor 57 is fed to a phase calculator 58. Within calculator 58, the phase value $\phi_n$ of the value $\delta P_n$ is calculated using an inverse trigonometric function. An array of phase values is then grouped for phase unwrapping in a phase unwrapper 59.

There is an inherent $2\pi$ ambiguity in the phase calculation function, and thus the result $\phi_n$ may need to be adjusted (referred to as "phase unwrapping") to establish the value of the rotation variable $\alpha$. This is done by serially comparing $\phi_n$ with $\phi_{n-k}$, starting from $n=n_0+k$, and, if $\phi_n$ is not less than $\phi_{n-k}$, recursively subtracting $2\pi$ from $\phi_n$ until the result becomes less than $\phi_{n-k}$.

If desired, this procedure can be refined to avoid potential errors due to noise. For example, the number of times $2\pi$ is subtracted from $\phi_n$ can be controlled to ensure a uniform trend in the amount by which the unwrapped values $\phi_n$ change. For example, to minimise noise disturbances, the mean value of all $\phi_n-\phi_{n-k}$, $\delta\phi_n$, out of the unwrapped array [..., $\phi_{n-k}$, $\phi_n$, $\phi_{n+k}$, ...] can be calculated, and then in a second stage the mean value $\delta\phi_n$ is used as guidance in deciding whether the last $2\pi$ adjustment (unwrapping) of $\phi_n$ should be avoided. The idea is to compare which value, i.e. $\phi_n$ or $\phi_n+2\pi$, is closer to the predicted straight line trend point of $\phi_n$ as indicated by $\phi_{n-k}+\delta\phi_n$, and use the closer value one for $\phi_n$ (the net effect is maintaining or cancelling the last $2\pi$ adjustment on $\phi_n$). This however leads to a degree of increased complexity and some extra time delay in pipeline implementations.

The unwrapped phase array is then forwarded to an evaluation component 60 where the parameter $\alpha$, i.e. the rotation variable, is evaluated in accordance with equation (1). The result is fed to an interpolator 61 for calculating the set of data sub-carrier channel response interpolation gains, which for each data sub-carrier would be:

$$(1-e^{j\alpha i/k})/(1-e^{j\alpha}) \text{ or } (1-e^{j\alpha i/k})/(1-e^{-j\alpha}).$$

Assuming k=3 and all the data sub-carriers are located between two pilots, there would be k-1 (i.e. 2) complex gains in the gain sets, corresponding to each of the two data sub-carrier positions respectively. The gain elements in the set are then successively fed to a complex multiplier 62 which multiples by $\delta P_n$ received from subtractor 57. The output is fed to a summer 63 which also receives $P_n$ from filter 55, thus outputting interpolations of the channel response at the data sub-carrier positions, as described by equations (8) and (9). The arrangement is such that equation (8) is used where n is the closest pilot, and equation (9) where n+k is the closest pilot, at least for data sub-carrier positions near the edges of the signal spectrum, i.e. where the carriers are not between a pair of pilots; for other data sub-carriers either of equations (8) and (9) could be used.

After the channel response at the data sub-carrier has been interpolated, the output from summer 63 is fed to a complex divider 64. The other input to divider 64 is the FFT result of each received data sub-carrier in a serial stream, the division of this stream by its corresponding channel response resulting in a stream of equalised data sub-carriers, with the channel distortion removed or alleviated. These equalised data sub-carriers appear at the output 66 of the channel equalisation block and are ready to be demodulated to recover the transmitted data in the demodulation and data decoding block.

If the parameter $\alpha$ is less than a pre-determined threshold value linear interpolation is used, i.e. $(1-e^{j\alpha i/k})/(1-e^{j\alpha})$ and $(1-e^{j\alpha i/k})/(1-e^{-j\alpha})$ are replaced by i/k and −i/k respectively. The value of the threshold is dependent on system design and the numerical calculation resolution adopted in a particular implementation. For example, assuming the algorithm is implemented with fixed point calculations (an integer algebra approach), the threshold may be the value that leads to the magnitude of $(1-e^{-j\alpha})$ having only one least significant bit (LSB) which is non-zero in amplitude. This situation would occur, for example, when the channel consists of a single ray (i.e. a flat channel response with no multi-path interference).

The filtering in time performed by filter 55 is particularly important where to improve accuracy interpolation is based on pilot carriers distributed over a plurality of symbols, possibly with the pilots in different symbols located at different sub-carriers (which would require the pilot selector 52 to operate differently from symbol to symbol), and/or possibly by combining a plurality of pilots at the same sub-carriers in respective symbols. For example, in DVB-T and ISDB-T systems, the only possibility of obtaining denser than the specified pilot distribution within a symbol is by filtering several consecutive symbols. In the DVB-T standard, pilots are transmitted every $12^{th}$ sub-carrier in a rotating fashion as shown in FIG. 6, a system called "scattered pilots". By filtering the sub-carriers in time, for example using sample and hold techniques, it is possible to obtain an estimate of the channel every third sub-carrier over a four OFDM symbol sequence. In the ISDB-T standard, the signal spectrum is split up into 13 segments, not all of which may contain coherent modulation. For the coherent segments the pilots sub-carriers are defined as scattered pilots as for DVB-T.

Alternatively, filtering can be achieved by linear interpolation among a group of consecutive symbols in which pilots are repeated at the same sub-carrier locations. In the cases of DVB-T and ISDB-T, this would require filtering over seven symbols, though a performance benefit can be achieved.

It is possible however to interpolate using only the pilots in the current OFDM symbol. This may be appropriate for some channel conditions where the multi-path fading is very fast which results in the filtering along the time direction being ineffective. The main drawback of this larger sampling distance in the frequency domain implies a smaller multi-path delay time spread can be accommodated. In principle, the time delay spread that can be handled by the algorithm is determined by k and the OFDM sub-carrier spacing frequency $\delta f_{OFDM}$ such that:

time spread=$1/(k\delta f_{OFDM})$

In an alternative implementation the OFDM carrier spectrum is partitioned into a number of sections and interpolation is performed separately in each of the sections. Section based modelling has some inherent advantages in segment based OFDM transmission schemes, such as the ISDB-T. In this alternative implementation, care should be exercised to avoid the sections being partitioned with too small a number of sampled frequency response points, as this may lead to an increase in the impact of noise and decrease system performance.

Another alternative implementation involves filtering the rotational angle variable α in time and using the filter output to guide the phase angle unwrapping operation. It is also possible, in a section-partition based implementation, for the α value from a previous section to be used to guide the current section's phase unwrapping operations. These alternatives can lead to reduction of pipelining complexity and throughput latency.

In an alternative implementation of the invention, the time delay between two versions of a multicarrier signal is determined. This is achieved by calculating the phase rotation variable α in the manner described above, and then calculating the time delay $\tau=\alpha/(-\delta\omega)$, where $\delta\omega$ is the angular frequency increment between the sub-carriers. In this case, all the sub-carriers may be pilots carrying known data values, and equalisation (and consequently interpolation) may not be required.

The invention claimed is:

1. A method of estimating the transfer function of a channel carrying a multicarrier signal using a receiver which derives complex values from respective sub-carriers of the signal, wherein the complex values of at least some sub-carriers are compared with predetermined values to determine distortion values for those sub-carriers, the method including the step of determining the rate at which the phases of the differences between the distortion values vary with sub-carrier frequency.

2. A method as claimed in claim 1, further comprising determining data distortion estimates for other sub-carriers by interpolating the distortion values, in accordance with said determined rate.

3. A method as claimed in claim 1 or 2, wherein the multicarrier transmission is an OFDM transmission.

4. A method as claimed in claim 3, wherein the OFDM transmission is a coherent transmission.

5. A method as claimed in claim 1 or 2, wherein the distortion values are determined for pilot sub-carriers carrying known data values.

6. A method as claimed in claim 5, wherein the distortion values are derived from pilot sub-carriers distributed amongst a plurality of multicarrier symbols.

7. A method as claimed in claim 6, wherein the pilot sub-carriers are located at different frequencies in different symbols.

8. A method as claimed in claim 6, wherein at least some of the pilot distortion values are derived from a plurality of pilot sub-carriers of the same frequency.

9. A method as claimed in claim 1 or 2, wherein the distortion values are determined by selecting, for each sub-carrier, the closest of a set of predetermined possible values to the complex value derived from the sub-carrier, and comparing the derived complex value with the selected value.

10. A method of correcting for distortion in a multicarrier receiver which derives complex values from respective sub-carriers of a multicarrier signal, wherein the complex values of at least some sub-carriers are compared with predetermined values to determine distortion values for those sub-carriers, the method including the step of determining the rate at which the phases of the differences between the distortion values vary with sub-carrier frequency, determining data distortion estimates for other sub-carriers by interpolating the distortion values in accordance with said determined rate, and then adjusting the amplitudes of the complex values of the other sub-carriers in accordance with the data distortion estimates for those sub-carriers.

11. A method of estimating the time delay between two versions of a multicarrier signal using a receiver which derives complex values from respective sub-carriers of the signal, wherein the complex values of at least some sub-carriers are compared with predetermined values to determine distortion values for those sub-carriers, the method including the step of determining the rate at which the phases of the differences between the distortion values vary with sub-carrier frequency, and then calculating the delay from the determined rate.

12. A multicarrier receiver having:
a signal processor which derives complex values from respective sub-carriers of a multicarrier signal; and
a channel estimator which compares the complex values of at least some sub-carriers with predetermined values to determine distortion values for those sub-carriers, the estimator determining the rate at which the phases of the differences between the distortion values vary with sub-carrier frequency.

13. A receiver as claimed in claim 12, wherein the channel estimator is operable to determine data distortion estimates for other sub-carriers by interpolating the distortion values in accordance with said determined rate and to adjust the amplitudes of the complex values of the other sub-carriers in accordance with the data distortion estimates for those sub-carriers.

14. A receiver as claimed in claim 12 or 13, including a time-delay determiner which estimates the time delay between two versions of the received multicarrier signal based on said determined rate.

* * * * *